United States Patent [19]

Nagashima

[11] Patent Number: 4,866,533
[45] Date of Patent: Sep. 12, 1989

[54] IMAGE PROCESSING DEVICE

[75] Inventor: Nao Nagashima, Yokohama, Japan

[73] Assignee: Canon Kabushiki Kaisha, Tokyo, Japan

[21] Appl. No.: 289,529

[22] Filed: Dec. 27, 1988

Related U.S. Application Data

[63] Continuation of Ser. No. 191,829, May 9, 1988, abandoned, which is a continuation of Ser. No. 677,490, Dec. 3, 1984, abandoned.

[30] Foreign Application Priority Data

| Dec. 9, 1983 | [JP] | Japan | 58-233151 |
| Dec. 9, 1983 | [JP] | Japan | 58-233152 |
| Dec. 9, 1983 | [JP] | Japan | 58-233153 |
| Dec. 9, 1983 | [JP] | Japan | 58-233154 |
| Dec. 9, 1983 | [JP] | Japan | 58-233155 |
| Dec. 9, 1983 | [JP] | Japan | 58-233156 |
| Dec. 9, 1983 | [JP] | Japan | 58-233157 |
| Dec. 9, 1983 | [JP] | Japan | 58-233158 |
| Dec. 9, 1983 | [JP] | Japan | 58-233159 |

[51] Int. Cl.$^4$ .............................................. H04N 1/40
[52] U.S. Cl. ................................... 358/443; 358/298; 358/261.4; 358/464; 358/456
[58] Field of Search ............... 358/280, 282, 283, 298, 358/260, 261.1, 262.1, 263, 261.4

[56] References Cited

U.S. PATENT DOCUMENTS

| 3,622,698 | 11/1971 | Richeson et al. | 358/280 |
| 4,138,693 | 2/1979 | Iizuka | 358/288 |
| 4,402,015 | 8/1983 | Yamada | 358/280 |
| 4,495,522 | 1/1985 | Matsunawa et al. | 358/280 |
| 4,517,605 | 5/1985 | Yokomizo | 358/280 |
| 4,520,395 | 5/1985 | Abe | 358/282 |
| 4,534,059 | 8/1985 | Yamada | 382/54 |
| 4,663,662 | 5/1987 | Sekizawa | 358/283 |

FOREIGN PATENT DOCUMENTS

| 74794 | 9/1982 | European Pat. Off. |
| 89931 | 3/1983 | European Pat. Off. |
| 2712286 | 9/1977 | Fed. Rep. of Germany |
| 3101552 | 12/1981 | Fed. Rep. of Germany |
| 3225415 | 2/1983 | Fed. Rep. of Germany |
| 3237393 | 4/1983 | Fed. Rep. of Germany |
| 106732 | 3/1976 | Japan |
| 52-106737 | 9/1977 | Japan |
| 2087683 | 7/1981 | United Kingdom |
| 2120896 | 12/1983 | United Kingdom |

Primary Examiner—Edward L. Coles, Sr.
Attorney, Agent, or Firm—Fitzpatrick, Cella, Harper & Scinto

[57] ABSTRACT

A binary or multi-level digital encoding device capable of digital encoding of image signal with plural sets of threshold levels through a simple and compact circuit. The plural sets of threshold levels are stored in a memory and selected according to the level of the image signal representing image density.

40 Claims, 11 Drawing Sheets

FIG. 8

| ADDRESS (BINARY) | IMAGE SIGNAL | DATA (BINARY) 7 6 5 4 3 2 1 0 |
|---|---|---|
| 0 0 0 0 0 0 0 0 | 0 | 0 0 0 0 0 0 0 0 |
| 0 0 0 0 0 0 0 1 | 1 | 0 0 0 0 0 0 0 0 |
| 0 0 0 0 0 0 1 0 | 2 | 0 0 0 0 0 0 0 0 |
| ... | ... | ... |
| 0 1 1 1 0 1 0 0 | 116 | 1 0 0 0 0 0 0 0 |
| 0 1 1 1 0 1 0 1 | 117 | 1 0 0 0 0 0 0 0 |
| 0 1 1 1 0 1 1 0 | 118 | 1 1 0 0 0 0 0 0 |
| 0 1 1 1 0 1 1 1 | 119 | 1 1 0 0 0 0 0 0 |
| 0 1 1 1 1 0 0 0 | 120 | 1 1 0 0 0 0 0 0 |
| 0 1 1 1 1 0 0 1 | 121 | 1 1 0 0 0 0 0 0 |
| 0 1 1 1 1 0 1 0 | 122 | 1 1 1 0 0 0 0 0 |
| 0 1 1 1 1 0 1 1 | 123 | 1 1 1 0 0 0 0 0 |
| 0 1 1 1 1 1 0 0 | 124 | 1 1 1 0 0 0 0 0 |
| 0 1 1 1 1 1 0 1 | 125 | 1 1 1 0 0 0 0 0 |
| 0 1 1 1 1 1 1 0 | 126 | 1 1 1 1 0 0 0 0 |
| 0 1 1 1 1 1 1 1 | 127 | 1 1 1 1 0 0 0 0 |
| 1 0 0 0 0 0 0 0 | 128 | 1 1 1 1 0 0 0 0 |
| 1 0 0 0 0 0 0 1 | 129 | 1 1 1 1 0 0 0 0 |
| 1 0 0 0 0 0 1 0 | 130 | 1 1 1 1 0 0 0 0 |
| 1 0 0 0 0 0 1 1 | 131 | 1 1 1 1 1 0 0 0 |
| 1 0 0 0 0 1 0 0 | 132 | 1 1 1 1 1 0 0 0 |
| 1 0 0 0 0 1 0 1 | 133 | 1 1 1 1 1 0 0 0 |
| 1 0 0 0 0 1 1 0 | 134 | 1 1 1 1 1 0 0 0 |
| 1 0 0 0 0 1 1 1 | 135 | 1 1 1 1 1 1 0 0 |
| 1 0 0 0 1 0 0 0 | 136 | 1 1 1 1 1 1 0 0 |
| 1 0 0 0 1 0 0 1 | 137 | 1 1 1 1 1 1 0 0 |
| 1 0 0 0 1 0 1 0 | 138 | 1 1 1 1 1 1 0 0 |
| 1 0 0 0 1 0 1 1 | 139 | 1 1 1 1 1 1 1 0 |
| 1 0 0 0 1 1 0 0 | 140 | 1 1 1 1 1 1 1 0 |
| ... | ... | ... |
| 1 1 1 1 1 1 0 1 | 253 | 1 1 1 1 1 1 1 1 |
| 1 1 1 1 1 1 1 0 | 254 | 1 1 1 1 1 1 1 1 |
| 1 1 1 1 1 1 1 1 | 255 | 1 1 1 1 1 1 1 1 |

FIG. 9

| | | | | | | | | |
|---|---|---|---|---|---|---|---|---|
| 7 | 168 | 172 | 176 | 180 | 184 | 188 | 192 | 196 |
| 6 | 164 | 80 | 84 | 88 | 92 | 96 | 100 | 200 |
| 5 | 160 | 76 | 24 | 28 | 32 | 36 | 104 | 204 |
| 4 | 156 | 72 | 20 | 3 | 6 | 40 | 108 | 208 |
| 3 | 150 | 68 | 16 | 12 | 9 | 44 | 112 | 212 |
| 2 | 148 | 64 | 60 | 56 | 52 | 48 | 116 | 216 |
| 1 | 144 | 140 | 136 | 132 | 128 | 122 | 120 | 220 |
| 0 | 252 | 248 | 244 | 240 | 236 | 232 | 228 | 224 |
| | 0 | 1 | 2 | 3 | 4 | 5 | 6 | 7 |

SUB SCANNING ADDRESS (vertical axis)

MAIN SCANNING ADDRESS (horizontal axis)

FIG. 10

| ADDRESS (BINARY) | | ADDRESS (BINARY) | MATRIX NO. | IMAGE SIGNAL | DATA (BINARY) |
|---|---|---|---|---|---|
| MAIN SCANNING | SUB SCANNING | | | | 76543210 |
| 000 | 000 | 00000000 |   | 0 | 00000000 |
| 000 | 000 | 00000001 |   | 1 | 00000000 |
| 000 | 000 | 00000010 |   | 2 | 00000000 |
| 000 | 000 | 00000011 |   | 3 | 00000000 |
| 000 | 000 | 00000100 |   | 4 | 00000000 |
| 000 | 000 | 00000101 |   | 5 | 00000000 |
| . | . | . |   | . | . |
| 000 | 000 | 10000000 |   | 128 | 00000000 |
| 000 | 000 | 10000001 | 0 | 129 | 10000000 |
| 000 | 000 | 10000010 |   | 130 | 10000000 |
| . | . | . |   | . | . |
| 000 | 000 | 11111100 |   | 252 | 11111111 |
| 000 | 000 | 11111101 |   | 253 | 11111111 |
| 000 | 000 | 11111110 |   | 254 | 11111111 |
| 000 | 000 | 11111111 |   | 255 | 11111111 |
| 000 | 001 | 00000000 |   | 0 | 00000000 |
| 000 | 001 | 00000001 |   | 1 | 00000000 |
| . | . | . | 1 | . | . |
| 000 | 001 | 11111111 |   | 255 | 11111111 |
| . | . | . | . | . | . |
| 111 | 111 | 00000000 |   | 0 | 00000000 |
| 111 | 111 | 00000001 |   | 1 | 00000000 |
| . | . | . | 63 | . | . |
| 111 | 111 | 11111110 |   | 254 | 11111111 |
| 111 | 111 | 11111111 |   | 255 | 11111111 |

IMAGE PROCESSING DEVICE

This application is a continuation-in-part, of application Ser. No. 191,829 filed May 9, 1988 which is a continuation of application Ser. No. 677,490, filed on Dec. 3, 1984, now abandoned.

BACKGROUND OF THE INVENTION

1. Field of the Invention

The present invention relates to an image processing device for binary or multi-level digital encoding of an image signal for use in a digital copier, an electronic file or the like.

2. Description of the Prior Art

The conventional device of this sort is composed of a comparator circuit for comparing an image signal with a reference signal, in which density adjustment of the output signal is achieved by rendering said reference signal variable, while a pseudotonal rendition is obtained by varying said reference signal according to a certain rule in synchronization with the image signal.

An example of such conventional image signal processing circuit is shown in FIG. 1.

Each of blocks 1, 2 respectively surrounded by broken lines performs binary encoding, and a multi-level encoding such as ternary or quaternary encoding is attained by increasing the number of said blocks. A comparator circuit 10 or 20 compares an input image signal with a multi-level reference signal supplied from a selector 11 or 21 and releases the result of said comparison.

The selector 11 or 21 selects either a fixed reference signal or a reference signal for pseudotonal reproduction. A latch circuit 13 or 23 generates a fixed reference signal as a slice level for binary encoding and is composed for example of a central processing unit or a dip switch.

A dither read-only memory (ROM) 12 or 22 stores reference signals, preferably plural sets thereof, for pseudotonal reproduction, and memorizes plural dither patterns in advance. A main scanning counter 30 controls the synchronization in the main scanning direction by counting pixel clock signals entered in synchronization with the image signal to be compared with a selected dither pattern. A latch circuit 32 selects one of the plural dither patterns stored in the dither ROM 12 or 22 according, for example, to the image quality.

In the circuit shown in FIG. 1, a multi-level digital encoding requires the blocks 1, 2 of a number corresponding to the number of levels, for example two blocks for ternary encoding or three blocks for quaternary encoding. Consequently, the magnitude of the circuit increases for a large number of levels.

Also, in the case of a multi-level signal conversion to obtain signals such as 00, 01, 10, 11 in binary numbers, an encoding of the binary encoded image signals obtained from said blocks has to be made through a very large circuit which is, practically, unacceptable.

Furthermore, such comparator circuit is inadequate for high-speed processing of an image signal with a large amount of data such as 14 or 16 bits since the delay time in processing is increased due to the serial connection of the circuits. The use of high-speed logic elements should allow one to avoid this drawback, but gives rise to a very high cost.

SUMMARY OF THE INVENTION

In consideration of the foregoing, an object of the present invention is to provide an image processing device capable of high-speed signal processing with a low cost.

Another object of the present invention is to provide an image processing device capable of binary or multi-level encoding in plural manners to an image signal.

Still another object of the present invention is to provide an image processing device capable of image processing for tonal reproduction with a simple structure.

Still another object of the present invention is to provide an image processing device easily adaptable to a desired image processing.

Still another object of the present invention is to provide an image processing device capable of image processing without the comparator required in the conventional binary or multi-level encoding.

These objects are attained, according to the present invention, by providing an image processing device in which binary or multi-level encoding for each of plural density levels of an image is stored, and in which the stored encoded data is released from the memory means by means of addressing the memory using an image signal entered by an input means as address data. In various embodiments, additional data may be used together with the entered image signal as address data. The memory may be either a permanent or a rewritable memory, in the latter case permitting one set of data to be replaced with another as desired.

The additional data used together with the input image signal as addressing data (in embodiment employing such additional data for addressing the memory) may, for example, represent a particular characteristic of the entered image signal, or may be a count indicating a number of synchronization signals received in association with the image signal, or a selected continuous toner reproduction mode. Also, the image data used as address data may be used in the form in which they are input into the device, or may first be converted in some fashion or other.

The foregoing and still other objects of the present invention, and the advantages thereof, will become fully apparent from the following detailed description of the preferred embodiments.

BRIEF DESCRIPTION OF THE DRAWINGS

FIG. 8 is a chart showing an example of the data stored in the memory;

FIG. 9 is a chart showing an example of a threshold matrix;

FIG. 10 is a chart showing another example of the data stored in the memory;

DETAILED DESCRIPTION OF THE PREFERRED EMBODIMENTS

Now the present invention will be clarified further by a detailed description of the preferred embodiments thereof, shown in the attached drawings.

Figure 1:
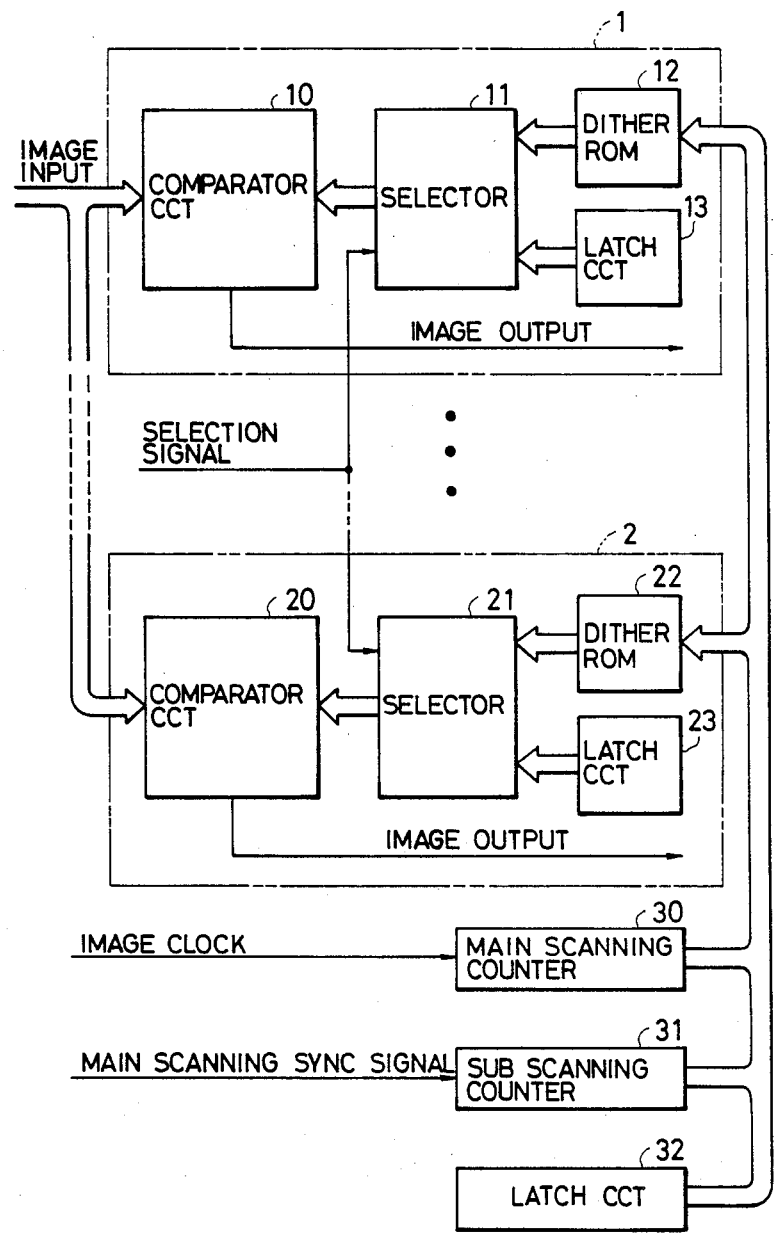
FIG. 1 is a block diagram of a conventional image signal processing circuit.
Figure 2:
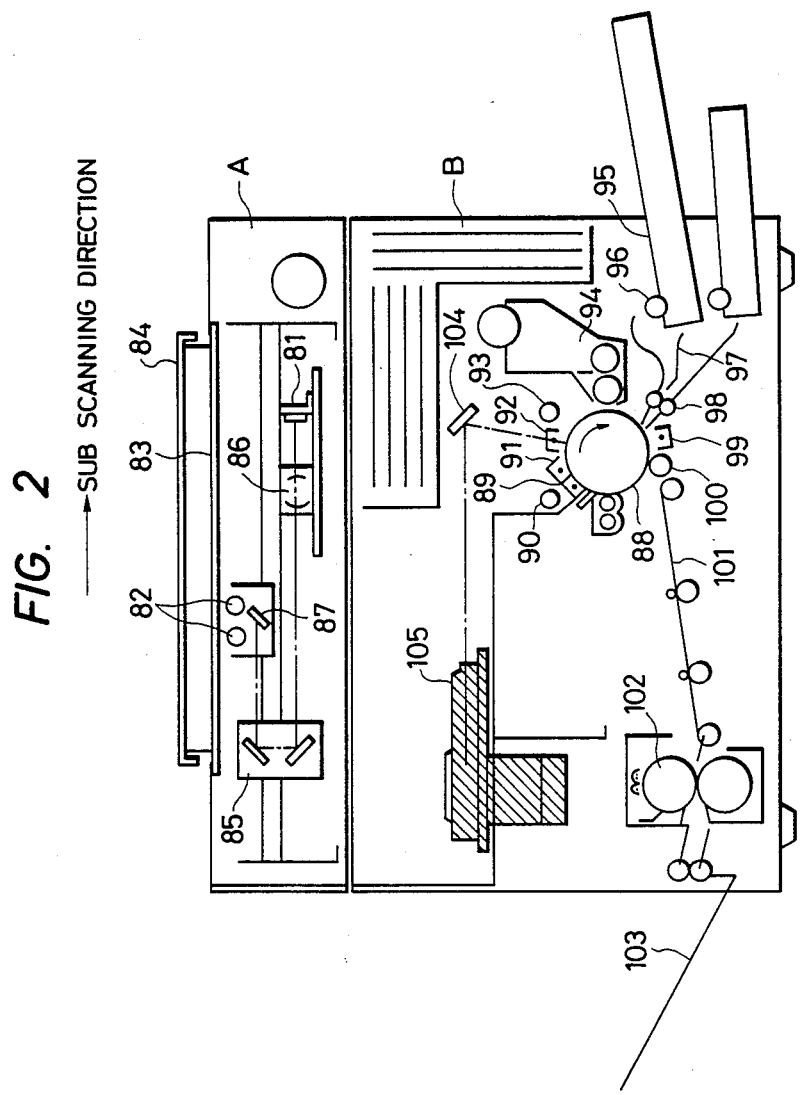
FIG. 2 is a cross-sectional view of a digital copier embodying the present invention.

FIG. 2 shows a digital copier embodying the present invention and composed of a reader A for photoelectrically reading an original decument to be copied, and a printer B for image recording on a recording material in response to an image signal released, or output from the reader A. In the reader A, the original document to be copied is placed, with the image bearing face thereof downwards, on an original support glass 83, and positioned at the far left corner (as seen from the front side of the copier). Said original is pressed against said original support glass by an original cover 84. The original is illuminated by a fluorescent lamp 82, and there is provided an optical path for guiding the reflected light onto a charge-coupled device (CCD) 81 through mirrors 85, 87 and a lens 86, wherein said mirrors 87 and 85 move with a relative speed ratio of 2:1. The abovementioned optical unit is displaced by a DC servo motor from left to right with a constant speed. Said speed is 180 mm/sec. in the forward movement in which the original is illuminated in the equal-size copying mode, and is 468 mm/sec. in the backward movement. The resolving power in the subsidiary scanning direction is 16 lines/mm. The reader can read originals of sizes from A5 to A3, in which an original of size A5, B5 or A4 is placed in a longitudinally oblong position as seen by the operator while an original of size B4 or A3 is placed in a laterally oblong position.

The main scanning width is 297 mm, corresponding to the length of the longer side of a sheet of A4 size, which is to be placed as explained above. In order to resolve said length with a resolving power of 16 pixels/mm, there are required $297 \times 16 = 4752$ bits in the CCD 81.

Now reference is made to FIG. 2 for explaining the printer B located under the reader A. The bit-serial image signal obtained in the reader A is supplied to a laser scanning optical unit 105 of the printer B. Said unit is composed of a semiconductor laser, a collimating lens, a rotary polygonal mirror, an F-$\theta$ lens and an image inclination correcting optical system. The image signal from the reader is supplied to the semiconductor laser for electro-optical conversion, and the emitted laser beam is converted into a parallel beam by the collimating lens and is guided to the polygonal mirror, rotating at 2,600 rpm, to scan a photosensitive member 88, with a scanning width of ca. 400 mm and with an effective scanning width of 297 mm, corresponding to the longer side of a sheet of A4 size. Consequently, in the above-described state, the semiconductor laser receives a frequency of ca. 20 MHz. The beam from said unit enters the photosensitive member 88 through a mirror 104, thus forming an electrostatic latent image on said member corresponding to the image signal from the reader A.

Said photosensitive member 88 is provided, for example, with a three-layered structure composed of a conductive layer, a photosensitive layer and an insulating layer, along which are positioned process components for enabling image formation. In FIG. 2 there are shown a preliminary charge eliminator 89, a preliminary charge eliminating lamp 90, a primary charger 91, a secondary charger 92, a flush exposure lamp 93, a developing unit 94 for rendering visible the latent image formed on the photosensitive member 88, a sheet cassette 95, a sheet feed roller 96 for extracting the recording sheets one by one from the cassette 95, a sheet feed guide 97, a registration roller 98, a transfer charger 99 for transferring the image from the photosensitive member onto the recording sheet, a separating roller 100, a transport guide 101, a fixing unit 102, and a tray 103 onto which the recording sheet is discharged. The speed of the photosensitive member 88 and the transport system is 180 mm/sec., which is same as that of the forward movement in the reader A. Consequently a copying speed of 30 sheets/min. can be obtained with the sheets of A4 size in case that the reader A is combined with the printer B. In the printer B, a separating belt is employed at the front side of the apparatus for separating the recording sheet from the photosensitive drum 88, so that the image is absent from a space corresponding to the width of said belt. The reader A cuts off the image signal in advance corresponding to the width (8 mm) of said separating belt, since, if the image signal is given to the portion corresponding to said separating belt, the toner deposited in said portion smears said belt and the ensuing recording sheets. Also, the reader A cuts off the image signal in advance in a leading end portion of 2 mm of the recording sheet, since the toner, if present in the leading end portion thereof, will cause sheet jamming by winding on the fixing roller.

The copier of the present embodiment has certain intelligent functions such as image editing, but said intelligent functions are achieved in the reader A by processing the signal read by the CCD 81, and the image signal released from the reader A always contains 4752 bits output at a determined speed. Said intelligent functions include an image size varying function for enlarging or reducing the image with an arbitrary image magnification within a range from 0.5 to 2.0 times, a trimming function for extracting a designated area of the image, a translating function for moving the trimmed image to an arbitrary position on the recording sheet, an original recognition function for identifying the original decument placed on the original support glass, a pseudotonal reproduction function utilizing a dither process designated by keys, an automatic exposure function for conducting a binary encoding according to the density of the original image, and combinations thereof.

Figure 3:
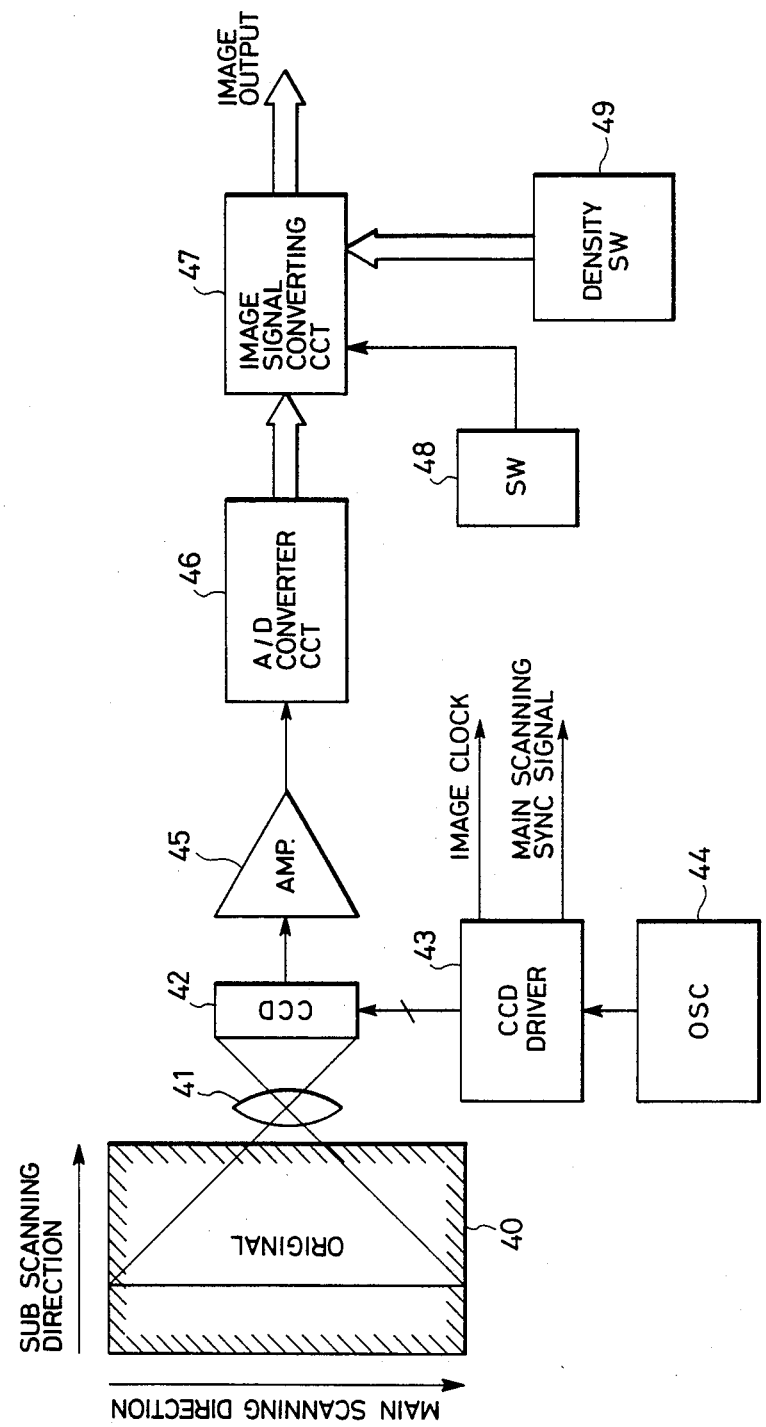
FIG. 3 is a block diagram of a signal processing circuit embodying the present invention.

FIG. 3 is a block diagram showing an embodiment of the circuit for processing the image signal in the reader A. An original 40 is illuminated by a light source, for example a fluorescent lamp, and the image of the original is focused by an optical lens 41 onto a linear array sensor 42 composed for example of a chargecoupled device. The image on the original is read by electrical main scanning in the reading direction of the CCD 42, combined with mechanical subsidiary scanning by an unrepresented sub-scanning drive system.

A CCD driver 43 generates drive signals for the CCD 42, for example, by frequency division of the signals from an oscillator circuit 44, and also generates image clock signals corresponding to the read-out of image signal from the CCD 42 and a main scanning synchronization signal corresponding to each line of main scanning.

An amplifier 45 amplifies the analog image signal released from the CCD 42 and representing the density level of the read image, and the amplified analog image signal is converted into a digital signal in an A/D converting circuit 46. The digital signal thus obtained, representing the image density level, is supplied to an image signal converting circuit 47 and is subjected to simple binary encoding, binary encoding in pseudotonal reproduction or multi-level digital encoding.

A switch 48 selects whether or not to adopt the pseudotonal reproduction process, and a density switch 49 selects the image density level at the binary or multi-level encoding. Said density switch 49 corresponds to a density control level to be operated, in a copier, by the operator for selecting the copy density. These switches 48, 49 are positioned on the upper face of the reader A for manipulation by the operator.

Now reference is made to FIGS. 4 to 10 for explaining the working principle of the image signal converting circuit 47 of the present invention.

Figure 4:
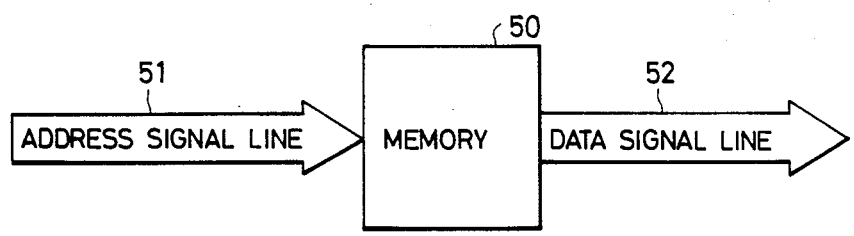
FIG. 4 is a schematic view showing a basic circuit structure of the present invention.

FIG. 4 shows a basic circuit for binary or multi-level encoding.

A randomly accessible memory 50 allows reading of data stored at an address to be determined by a signal which is supplied through an address signal line 51. For this memory there may be employed, for example, an EPROM 2732A or a static RAM 2128 supplied by Intel Corp. In the case of employing a non-volatile memory such as an EPROM or a masked ROM, patterns to be explained later may be stored in advance. On the other hand, a volatile memory such as a static RAM requires additional hardware for storing pattern data each time the power supply is turned on, but provides a possibility of arbitrarily modifying the patterns.

The digital image signal to be processed is supplied to the address signal line 51 to address the memory 50, thereby obtaining a binary or multi-level encoded output image signal through a data signal line 52.

In the following there will be given an explanation of the procedure of obtaining binary encoded signal while making reference to FIG. 5.

In FIG. 5, the abscissa represents the value of an input image signal, while the ordinate represents the value of an output image signal. It is assumed that the input image signal has a range of 8 binary bits or 256 decimal levels (0–255) in which the levels 0 and 255 respectively represent white and black. In the output signal, levels 0 and 1 respectively indicate white and black.

The binary encoding is achieved by connecting the input image signal with the address signal line 51 in such a manner that the values of the input image signal correspond to the addresses in the memory 50 and binary patterns are stared in advance in said memory corresponding to said addresses.

Figure 5A:
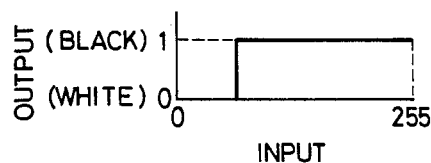
FIGS. 5A–C are schematic views showing the principle of binary encoding.
Figure 5B:
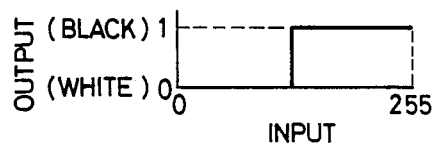
Figure 5C:
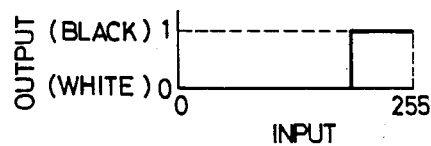

FIGS. 5A, 5B and 5C respectively show patterns to be stored in the memory for obtaining an output image signal of a high density, a medium density and a low density.

In FIG. 5A the output image signal changes from "0" to "1" at a value of the input image signal relatively close to the level 0, whereby the population of the level 1 (black) increases in the output image signal to provide a high-density image. Similarly in FIG. 5B and in FIG. 5C, the output image signal changes from "0" to "1" respectively at a central level of the input image signal and at a level close to the level 255, thus providing a medium-density image and a low-density image.

FIG. 6 shows the process of quaternary encoding, wherein the input image signal has a range of 8 binary bits while the output image signal has a range of 2 binary bits or four decimal levels (0, 1, 2, 3).

Figure 6A:
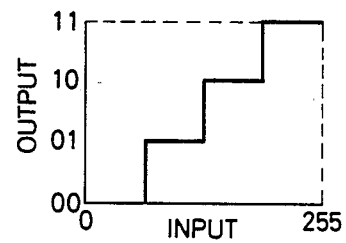
FIGS. 6A–C are schematic views showing the principle of quaternary encoding.
Figure 6B:
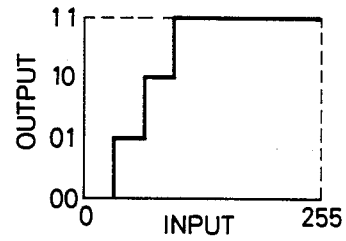
Figure 6C:
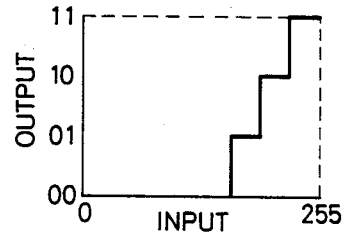

FIGS. 6A, 6B and 6C show examples of linear quaternary encoding of the input image signal, which is achieved by storing patterns of 00, 01, 10 and 11 in the memory 50 in a similar manner as in FIGS. 5A–C. FIGS. 6A, 6B and 6C respectively provide output image signals of a medium density, a high density and a low density.

Instead of the linear quaternary encoding as shown in FIG. 6, it is also possible to conduct a multi-level digital encoding for visual contrast correction or a particular visual effect.

Figure 7:
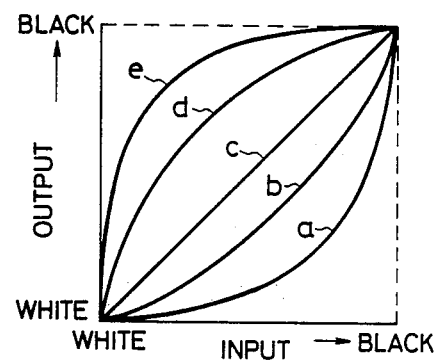
FIG. 7 is a chart showing a correcting operation for an image signal.

FIG. 7 shows an example of such encoding, wherein the image density of the output image signal increases in the order of curves a, b, c, d and e. Consequently an image conversion is attained simultaneously with the quaternary encoding by modifying the data in the memory 50 according to the principle shown in FIG. 6.

Also the above-mentioned Intel's EPROM 2732A has twelve address lines (4 KBytes) and eight data lines (8 bits). Therefore four address lines are unused in the case that the input image signal has a range of 8 bits, and seven data lines are unused for binary encoding. It is thus possible to modify the density at the binary encoding by plural binary encoding patterns, as shown in FIGS. 5A, 5B and 5C, in said unused part of the memory and by selecting said plural patterns with suitable selecting signals supplied through said unused address lines. Said EPROM 2732A, if employed as the memory 50, allows the selection of $2^4 \times 8 = 128$ binary encoding patterns.

FIG. 8 shows an example of data to be stored in the memory 50, in the case of binary encoding for an input image signal of 8 bits. In the illustrated example, the data of 8 bits respectively represent different levels of binary encoding, giving a higher image density toward the 7th bit. In the case of utilizing the excess address lines as mentioned above, the upper 4 bits can be used for the selecting signals while the lower 8 bits can be used for the image signal. In this case plural patterns similar to that shown in FIG. 8 can be prepared corresponding to the addresses "0000XXXXXXXX", "0001XXXXXXXX", etc. In this manner the binary encoded output signal changes for a same image signal according to a change of the value of the selecting signal.

In the following is explained the process of pseudotonal reproduction.

FIG. 9 shows an example of an $8 \times 8$ threshold value matrix for use in the dither method. Each figure in the matrix represents a threshold value for binary encoding, and the input image signal, ranging from 0 to 255 in 8-bit range, is discriminated as black if it exceeds said threshold value at the binary encoding. The conventional pseudotonal reproduction utilizing visual effect is achieved by storing the above-explained matrix, for example, in a ROM, reading the stored data from said ROM in synchronization with the image clock signals and the main scanning synchronization signal and comparing said data with the input image signal in successive manner to determine the black-to-white ratio in a unit area.

In the present embodiment a pseudotonal reproduction equivalent to the above-described dither method is achieved through the use of binary or multi-level digital encoding described above, by preparing binary or multi-level encoding patterns in the memory 50 for encoding the input image signal (having levels 0–255) respectively corresponding to the 64 elements of the matrix shown in FIG. 9 and adding element-selecting signal lines in the address lines.

FIG. 10 shows an example of the data stored in the memory 50, in which the lower 8 bits of the address signal are allotted to the input image signal, while the upper 6 bits are used for a subsidiary address signal of 3 bits and a main address signal of 3 bits for defining an element in the 8×8 matrix. In this case there are required 14 address lines, and for this purpose there may be employed, for example, an EPROM 27128 of 16K×8 bits supplied by Intel Corp.

A pattern similar to that shown in FIG. 8 is stored for each of the elements 0–63 defined by said subsidiary and main address signals. More specifically, said pattern contains the binary output 1 or 0 obtained by comparing all the levels 0–255 of the input image signal with one of the threshold values of the dither matrix shown in FIG. 9.

Also the data lines of 8 bits are allotted to different binary encoding data for all the input image data, corresponding to plural dither matrixes obtained by applying conversions of characteristics shown in FIG. 7 to the matrix data shown in FIG. 9. In this manner it is rendered possible to obtain output image signals of high, medium or low density through plural pseudotonal processings.

Thus, as in the aforementioned case of binary encoding, the selection of plural patterns is possible by expanding the address signal lines of the memory 50 for the selecting signal. Also, if a multi-level output is required, several bits are selected out of 8 data bits.

Figure 11:
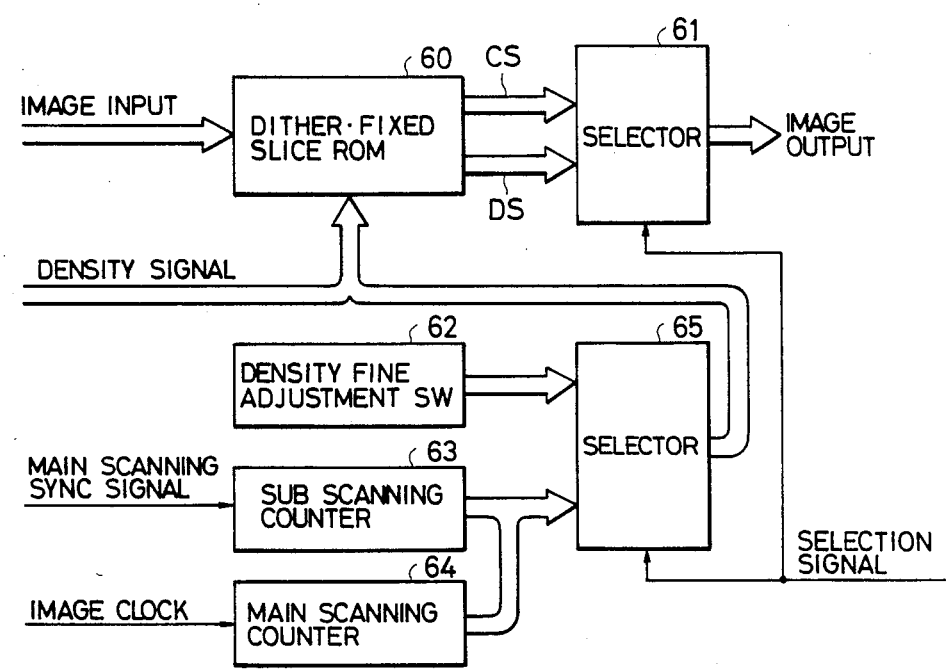
FIGS. 11, 12 and 13 are block diagrams showing examples of the image signal converting circuit.

FIG. 11 shows an example of the image signal converting circuit utilizing a memory for digital encoding with a fixed threshold value and for pseudotonal data processing explained above. A dither/fixed slice ROM 60 stores the patterns for the digital encoding with the fixed threshold level and for the pseudotonal processing, and either process can be adopted by selecting said patterns. There are provided plural data lines, for example 8 bits, of which 4 bits are used for data CS for fixed threshold level, while the other 4 bits are used for data DS for the dither process. The output signals of 8 bits representing two series are released simultaneously, and are selected by a selector 61 activated by a selecting signal generated by a tonal process selecting switch 48. Said selector selects for example 1 bit in the case of binary encoding or 2 bits in the case of quaternary encoding to obtain the output image signal. In this manner the selector 61 selects either the fixed threshold value or the dither process, and also performs the function of density selection corresponding to the density switch 49 shown in FIG. 3.

In the embodiment shown in FIG. 11, the density signal from the density switch 49 is directly supplied as the address signal for the dither/fixed slice ROM 60 as explained above.

The address signal supplied to the dither/fixed slice ROM 60 has to be regulated between the fixed threshold process and the dither process by a period corresponding to the element selecting signal since, in the dither process, an element selecting signal for the dither matrix is to be entered in sychronization with the input image signal, whereas a fixed address signal is to be supplied in the fixed threshold process. Said switching of the address signal is performed by a selector 65 which is activated by the selecting signal from the switch 48 and which selects either a signal from a density fine-control switch 62 in the fixed threshold process, or a dither matrix selecting signal from the subsidiary counter 63 and main counter 64 in the dither process.

The density fine-control switch 62 is provided for achieving a finer density control than with the density switch 49, and is connected to an address signal line of the ROM 60 together with the density switch 49.

Figure 12:
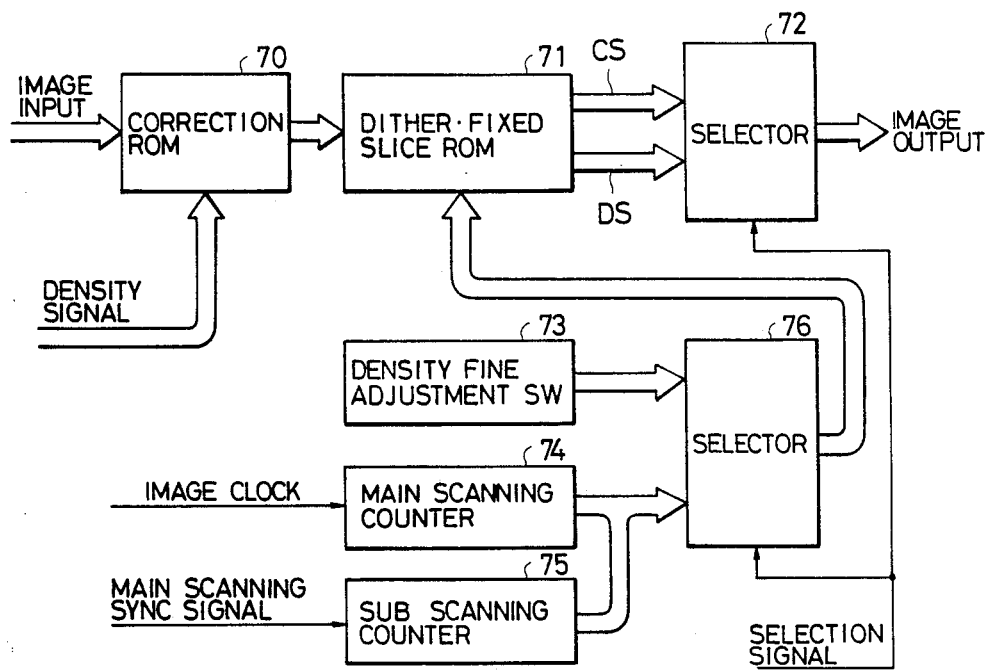

In the embodiment shown in FIG. 11, the capacity of the dither/fixed slice ROM becomes large when the number of dither matrixes is increased. Therefore, in an embodiment shown in FIG. 12, there is at first conducted the image processing by the density signal for the correction as shown in FIG. 7.

A correction ROM 70 for performing a correction on the input signal as shown in FIG. 7, is composed of a memory as shown in FIG. 4, which receives the input image signal and the density signal through the address signal lines and stores the result of processing at an address determined by the image signal. For example, said memory stores data in such a manner that an output image signal of 8 bits is obtained according to the input-/output characteristic shown in FIG. 7, in response to an input image signal of 8 bits. The characteristic curves a–e are selected by the density signal from the density switch 49.

The dither/fixed slice ROM 71 is similar to the ROM shown in FIG. 11, but can be of a smaller capacity, since the density selection in this case is conducted in advance in the correction ROM 70 so that the data for density correction need not be stored in the ROM 71.

Selector 72, density switch 73, main counter 74, subsidiary counter 75 and selector 76 are the same as those represented by 61, 62, 63, 64 and 65 in FIG. 11.

Figure 13:
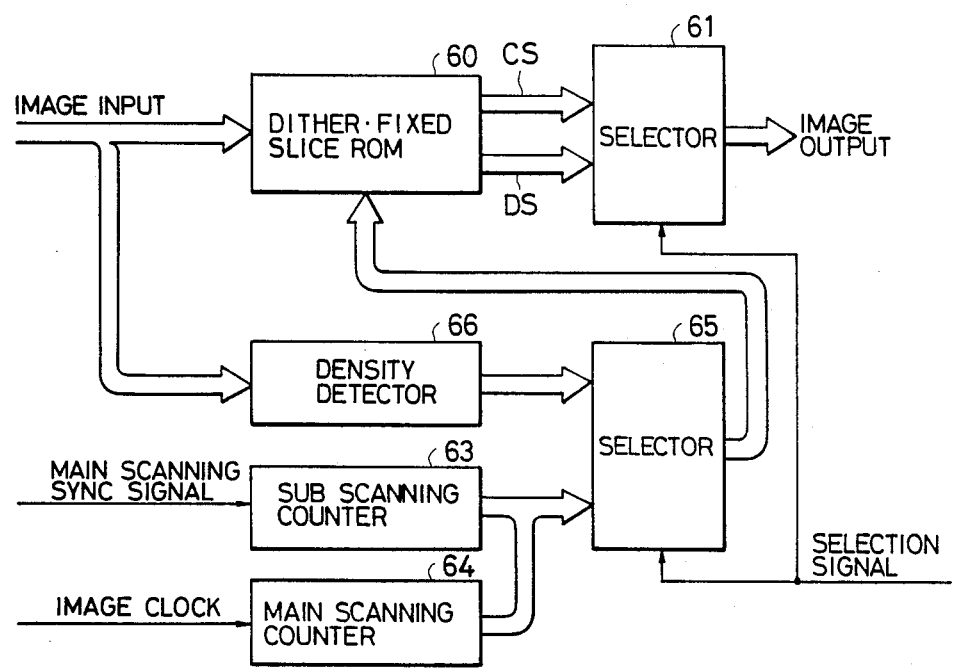

FIG. 13 shows another embodiment of the image signal converting circuit 47 which is provided with an automatic exposure function for regulating the binary or multi-level encoding operation according to the original image density, for example the background density level of the original, thereby achieving satisfactory reproduction of the original image. In FIG. 13, components which are the same as those in FIG. 11 are represented by same numbers. In FIG. 13, the density fine-control switch 62 in FIG. 11 is replaced by a density detector 66 which is connected to the input terminal of the selector 65.

The density detector 66 receives the image signal from the A/D converting circuit 46, and detects a white and/or black peak in each line of the image signal. It thus identifies the content (for example background density or image density) of each line of the image signal and supplies the selector 65 with a detection signal for obtaining a binary or multi-level encoded output signal corresponding to the image signal.

When the fixed threshold process is selected by the selecting signal, the selector 65 selects the detection signal from the density detector 66 and releases said detection signal as the selecting signal for the dither/fixed slice ROM 60. Consequently the dither/fixed slice ROM 60 selects data for binary for multi-level encoding suitable for the image signal in response to the detection signal supplied through the address signal line. The density detector 66 may generate the detection signal in response to the peak values of plural lines or in response to the status of the entier original by conducting a preliminary scanning of the original prior to the actual image reading. It is furthermore possible to provide both the density fine-control switch 62 shown in FIG. 11 and the density detector 66 shown in FIG. 13 for selection according to the necessity. In this manner the binary or multi-level encoding can be achieved in more suitable manner according to the original image.

In the foregoing embodiments the operator selects either the tonal reproduction process or the fixed threshold process by the switch 48, but it is also possible to identify the status of the image through the image signal obtained therefrom and to automatically change the selecting signal according to whether the original image is a line tone image or a continuous tone image. In this manner it is rendered possible to satisfactorily process an image in which continuous tone image and line tone image are mixedly present.

The image signal processing explained before is naturally applicable not only to the digital copier but also to other apparatus such as a facsimile or an electronic file.

As explained in the foregoing, the binary or multi-level encoding of an image signal can be achieved at a high speed with a simple and inexpensive circuit.

What I claim is:

1. An image processing device comprising:
   input means for entering an image signal representing a density level of an image;
   memory means storing data for binary or multi-level encoding for each density level of the image, the data stored in said memory means being fixed-threshold-value processed data or halftone processed data; and
   means for addressing said memory means using the image signal entered by said input means as address data for said memory means,
   wherein said memory means is adapted to release the binary or multi-level encoded data corresponding to the density level of the image, by addressing said memory means by means of said addressing means, and
   wherein said memory means stores plural sets of data for binary or multi-level encoding corresponding to each density level of the image.

2. An image processing device according to claim 1, wherein said memory means is adapted to have contents thereof rewritten, so than the data stored therein can be replaced with other data.

3. An image processing device according to claim 2, wherein said memory means stores plural sets of data for binary or multi-level encoding corresponding to each density level of the image.

4. An image processing device according to claim 1, wherein said input means comprises reader means for reading an original image and generating an image signal representing the density level of the image.

5. An image processing device according to claim 1, wherein said input means is adapted to generate a digital signal of plural bits representing the density level of the image.

6. An image processing device comprising:
   input means for entering an image signal representing a density level of an image;
   memory means for storing plural sets of data for binary or multi-level encoding corresponding to each density level of the image, the data stored in said memory means being fixed-threshold-value processed data or halftone processed data;
   selector means for selecting a process mode for the image signal;
   means for addressing said memory means using the image signal entered by said input means as address data for said memory means,
   wherein said memory means is adapted to selectively release binary or multi-level encoded data corresponding to the density level of the image, through addressing by means of said addressing means and by a selecting signal from said selector means, in a mode selected by said selector means.

7. An image processing device according to claim 6, wherein said selector means is adapted to set the density of the output image signal.

8. An image processing device according to claim 6, wherein said input means comprises reader means for reading an original image and generating an image signal representing the density level of the image.

9. An image processing device according to claim 6, wherein said input means is adapted to generate a digital signal of plural bits representing the density level of the image.

10. An image processing device comprising:
    input means for entering an image signal representing a density level of an image;
    memory means for storing plural sets of data for binary or multi-level encoding for each density level of the image, the data stored in said memory means being fixed-threshold-value processed data or halftone processed data; and
    means for addressing said memory means using the image signal entered by said input means as address data for said memory means,
    wherein said memory means is adapted to release plural binary or multi-level encoded data corresponding to a density level of the image, in response to addressing by said addressing means.

11. An image processing device according to claim 10, further comprising selector means for selecting one of plural data released from said memory means.

12. An image processing device according to claim 10, wherein said memory means is adapted to simultaneously release plural binary or multi-level encoded data.

13. An image processing device according to claim 10, wherein said input means comprises reader means for reading an original image and generating an image signal representing the density level of the image.

14. An image processing device according to claim 10, wherein said input means is adapted to generate a digital signal of plural bits representing the density level of the image.

15. An image processing device according to claim 10 wherein the data stored in said memory means is fixed-threshold-value processed data or halftone processed data.

16. An image processing device comprising:
    input means for entering an image signal representing a density level of an image;
    memory means for storing plural sets of data for binary or multi-level encoding for each density level of the image, in which at least one of said plural sets is the data for continuous tone reproduction; and
    means for addressing said memory means using the image signal entered by said input means as address data for said memory means,
    wherein said memory means is adapted to release plural binary or multi-level encoded data, containing at least halftone processed data, in response to addressing by means of said addressing means.

17. An image processing device according to claim 16, further comprising selector means for selecting one of plural data released from said memory means.

18. An image processing device according to claim 16, wherein said input means comprises reader means for reading an original image and generating an image signal representing the density level of the image.

19. An image processing device according to claim 16, wherein said input means is adapted to generate a digital signal of plural bits representing the density level of the image.

20. An image processing device comprising:
input means for entering an image signal representing a density level of an image;
converting means for converting a characteristic of the image signal supplied from said input means;
memory means for storing data for binary or multi-level encoding for each density level of the image signal, the data stored in said memory means being fixed-threshold-level processed data or halftone processed data; and
means for addressing said memory means using the digital image signal entered by said input means and converted by said converting means as address data for said memory means,
wherein said memory means is adapted to release binary or multi-level encoded data corresponding to the density level of the image, in response to addressing by the digital image signal of which the characteristic has been converted by said converting means, thereby performing encoding.

21. An image processing device according to claim 20, wherein said converting means is capable of plural characteristic converting operations.

22. An image processing device according to claim 20, wherein said input means comprises reader means for reading an original image and generating an image signal representing the density level of the image.

23. An image processing device according to claim 20, wherein said input means is adapted to generate a digital signal of plural bits representing the density level of the image.

24. An image processing device comprising:
input means for entering an image signal representing a density level of an image;
counter means for counting a synchronization signal synchronized with the image signal entered from said input means;
memory means for storing data for binary or multi-level encoding for each density level of the image, the data stored in said memory means being half-tone processed data; and
means for directly addressing said memory means based on the count of said counter means and the image signal entered by said input means as address data for said memory means,
wherein said memory means is adapted to release binary or multi-level encoded data in response to addressing by said addressing means.

25. An image processing device according to claim 24, wherein said memory means stores plural sets of data for binary or multi-level encoding for continuous tone reproduction.

26. An image processing device according to claim 24, wherein said input means comprises reader means for reading an original image and generating an image signal representing the density level of the image.

27. An image processing device according to claim 24, wherein said input means is adapted to generate a digital signal of plural bits representing the density level of the image.

28. An image processing device comprising:
input means for entering an image signal representing a density level of an image;
memory means for storing plural sets of data for binary or multi-level encoding corresponding to each density level of the image, the data stored in said memory means being halftone processed data;
selector means for selecting a mode of continuous tone reproduction for the image signal; and
means for addressing said memory means using the image signal input by said input means and a selector signal from said selector means as address data for said memory means,
wherein said memory means is adapted to selectively release binary or multi-level encoded data for continuous tone reproduction corresponding to the density level of the image, in response to addressing by said addressing means, according to a mode selected by said selector means.

29. An image processing device according to claim 28, wherein said selector means is adapted to set the density of the output image signal.

30. An image processing device according to claim 28, wherein said input means comprises reader means for reading an original image and generating an image signal representing the density level of the image.

31. An image processing device according to claim 28, wherein said input means is adapted to generate a digital signal of plural bits representing the density level of the image.

32. An image processing device comprising:
input means for entering an image signal representing a density level of an image;
memory means for storing plural sets of data for binary or multi-level encoding for continuous tone reproduction corresponding to each density level of the image, the data stored in said memory means being halftone processed data; and
means for addressing said memory means using the image signal entered by said input means as address data for said memory means,
wherein said memory means is adapted to release the binary or multi-level encoded data corresponding to the density level of the image, by addressing said memory means by means of said addressing means.

33. An image processing device according to claim 32, wherein said memory means is adapted to release plural binary or multi-level encoded data corresponding to the density level of the image, and said image processing device comprises selector means for selecting one of plural data released from said memory means.

34. An image processing device according to claim 32, wherein said input means comprises reader means for reading an original image and generating an image signal representing the density level of the image.

35. An image processing device according to claim 32, wherein said input means is adapted to generate a digital signal of plural bits representing the density level of the image.

36. An image processing device comprising:
input means for entering an image signal representing a density level of an image;

detector means for detecting the status of the image signal entered from said input means;

memory means for storing data for binary or multi-level encoding corresponding to each density level of the image, the data stored in said memory means being threshold-value processed data; and means for addressing said memory means using the image signal entered by said input means as address data for said memory means, wherein said memory means is adapted to selectively release binary or multi-level encoded data corresponding to the detection of status by said detector means, in response to addressing by said addressing means.

37. An image processing device according to claim 36, wherein said detector means is adapted to detect the peak value of the image signal.

38. An image processing device according to claim 36, wherein said input means comprises reader means for reading an original image and generating an image signal representing the density level of the image.

39. An image processing device according to claim 36, wherein said input means is adapted to generate a digital signal of plural bits representing the density level of the image.

40. An image processing device according to claim 36 wherein said memory means stores plural sets of data for binary or multi-level encoding corresponding to each density level of the image.

* * * * *

UNITED STATES PATENT AND TRADEMARK OFFICE
CERTIFICATE OF CORRECTION

PATENT NO. : 4,866,533

DATED : September 12, 1989

INVENTOR(S) : NAO NAGASHIMA

It is certified that error appears in the above-identified patent and that said Letters Patent is hereby corrected as shown below:

COLUMN 1

Line 4, "continuation-in-part," should read --continuation,--.

COLUMN 3

Line 26, "abovementioned" should read --above-mentioned--.

COLUMN 4

Line 46, "decument" should read --document--.
    Line 57, "chargecoupled" should read --charge-coupled--.

COLUMN 5

Line 54, "stared" should read --stored--.

COLUMN 8

Line 63, "binary for" should read --binary or--.
    Line 68, "entier" should read --entire--.

COLUMN 9

Line 46, "than" should read --that--.

UNITED STATES PATENT AND TRADEMARK OFFICE
CERTIFICATE OF CORRECTION

PATENT NO. : 4,866,533

DATED : September 12, 1989

INVENTOR(S) : NAO NAGASHIMA

It is certified that error appears in the above-identified patent and that said Letters Patent is hereby corrected as shown below:

COLUMN 10

Line 53, "claim 10" should read --claim 10,--.

COLUMN 14

Line 12, "claim 36" should read --claim 36,--.

Signed and Sealed this

Fourteenth Day of January, 1992

Attest:

HARRY F. MANBECK, JR.

Attesting Officer

Commissioner of Patents and Trademarks